(12) United States Patent
Miwa

(10) Patent No.: US 7,031,396 B2
(45) Date of Patent: Apr. 18, 2006

(54) TRANSMISSION AND RECEPTION METHOD WITH MULTIPLE REMOTE CONTROLLERS

(75) Inventor: Kenichi Miwa, Tokyo (JP)

(73) Assignee: SMK Corporation, Tokyo (JP)

( * ) Notice: Subject to any disclaimer, the term of this patent is extended or adjusted under 35 U.S.C. 154(b) by 773 days.

(21) Appl. No.: 10/176,286

(22) Filed: Jun. 19, 2002

(65) Prior Publication Data

US 2003/0108111 A1    Jun. 12, 2003

(30) Foreign Application Priority Data

Dec. 12, 2001   (JP)   ............... 2001-379125

(51) Int. Cl.
*H04B 3/00*    (2006.01)
*H04L 25/00*   (2006.01)

(52) U.S. Cl. ............... 375/259; 375/285; 375/369
(58) Field of Classification Search ................ 375/259, 375/285, 369, 370
See application file for complete search history.

(56) References Cited

U.S. PATENT DOCUMENTS

| | | | |
|---|---|---|---|
| 3,593,138 A * | 7/1971 | Dunn et al. ................. | 375/211 |
| 5,640,160 A | 6/1997 | Miwa | |
| 5,663,716 A | 9/1997 | Miwa et al. ........... | 340/825.04 |
| 5,663,717 A | 9/1997 | DeLuca | |
| 5,838,226 A * | 11/1998 | Houggy et al. ........ | 340/310.11 |
| 2005/0025101 A1* | 2/2005 | Paneth et al. ............... | 370/336 |
| 2005/0054290 A1* | 3/2005 | Logan et al. ............... | 455/41.2 |

* cited by examiner

*Primary Examiner*—Jay K. Patel
*Assistant Examiner*—Qutub Ghulamali
(74) *Attorney, Agent, or Firm*—Darby & Darby

(57) ABSTRACT

A transmission and reception method permits simultaneous use of multiple remote controllers at the same frequency to a single receiver without mutual interference. A transmission period consists of a transmission enabled period for transmitting a transmission signal from a remote controller, and a transmission disabled period for disabling the signal transmission. Individual remote controllers can repeat the transmission. For the individual remote controllers, one period of the transmission period is $2^i$ ("I" is a natural number equal to or more than 3, and is set to a proper number different from one channel to another) times a unit transmission period. The transmission period consists of a transmission enabled period for one fourth of one period, a transmission disabled period for one eighth of one period, a transmission enabled period for one eighth of one period, a transmission disabled period for one fourth of one period, a transmission enabled period for one eighth of one period, and a transmission disabled period for one eighth of one period in this order. The sequence in the foregoing sentence is repeated continuously.

2 Claims, 9 Drawing Sheets

TRANSMISSION AND RECEPTION METHOD WITH MULTIPLE REMOTE CONTROLLERS

BACKGROUND OF THE INVENTION

1. Field of the Invention

The present invention relates to a transmission and reception method with multiple remote controllers where a single receiver can receive signals at the same frequency from multiple remote controllers using infrared, radio wave, or acoustic wave while identifying the individual remote controllers.

2. Description of the Related Art

Conventional remote controllers for remotely operated individual machines use carrier waves at different frequencies for transmitting signals. The receiver receives the signals transmitted from different remote controllers, and demodulates them independently to identify the signals transmitted from the individual remote controllers.

The conventional remote controller uses a transmission method in which an analog signal is sampled to produce a digital signal. A predetermined bit length of the digital signal is set as one frame of a transmission data. The transmission data is transmitted from the remote controller in a predetermined time interval.

This transmission and reception method for the remote controller does not have any specific problems as long as only a single remote controller is used with a corresponding the single receiver.

When multiple remote controllers attempt to simultaneously transmit instruction signals for different controls to the single receiver at the single location, because of the chance that output signals from the multiple remote controllers interfere with one another, it is necessary to avoid interference in this application form.

However, when the same type of remote controllers using the same carrier frequency and the same transmission interval for transmitting data are used simultaneously at the same location, the data transmitted from more than one of the multiple remote controllers may have the same timing. This can cause interference. Because received data overlap at the receiving units, the received data cannot be interpreted. As a result, the remote control is disabled.

The applicant has proposed "TRANSMISSION AND RECEPTION METHOD WITH MULTIPLE REMOTE CONTROLLERS" (Japanese Patent Laid-Open Publication No. Hei. 7-284174, referred to as Prior art 1 hereinafter) to solve these problems which discloses the following.

1. A transmission and reception method with multiple remote controllers comprising:

at least two remote controllers for transmitting transmission signals consisting of equal unit transmission periods (TT) for individual channels;

a single receiver for receiving said transmission signals;

wherein one period of a transmission period (ST) of said transmission signal consists of a transmission enabled period (STa) and a transmission disabled period (STb), these periods have a relationship of Sta≦STb; and said unit transmission period (TT) consists of a data transmission period (DTa) and a data stop period (DTb), said transmission enabled period (STa) is set to said unit transmission period (TT)×$2^{i-1}$ (where "I" is a positive integer, and is a unique number set to a proper number that is different from one channel to another), said data transmission period (DTa) and said data stop period (DTb) have a relationship of DTa≦DTb, and said transmission period (ST) is repeated for the transmission.

2. The transmission and reception method with multiple remote controllers according to claim 1, wherein said transmission enabled period (STa) and said transmission disabled period (STb) have a relationship of STa=STb.

3. The transmission and reception method with multiple remote controllers according to claim 1 or claim 2, wherein said data transmission period (DTa) and said data stop period (DTb) have a relationship of DTa=DTb.

4. The transmission and reception method with multiple remote controllers according to any one of claim 1 to claim 3, wherein a smallest possible number is selected first when said unique number "I" is assigned.

The unit transmission period (TT) of the transmission signals transmitted from the individual remote controllers 101A to 101D is equal among the individual channels in Prior art 1. The data transmission period (DTa) and the data stop period (DTb), of which the unit transmission period (TT) consists, have the relationship that the data transmission period (DTa)≦the data stop period (DTb).

Because states where the transmission signals from the individual remote controllers receive no interference from the other remote controllers are always generated within a predetermined period, while the transmission signals are assumed to cause interference state in Prior art 1, even if multiple remote controllers are used for a single receiver at the same frequency and at the same location, it is possible to transmit at the same frequency based on the same protocol.

The transmission period (ST) for transmitting signals from the individual channels, which consists of the transmission enabled period (STa), and the transmission disabled period (STb), is set such that the transmission enabled period (STa)≦the transmission disabled period (STb), an ith ("I" is a natural number) remote controller sets the number of the data transmission periods (DTa) to $2^{i-1}$ ("I" is a positive integer), and sets the transmission enabled period (STa) to the unit transmission period (TT)×$2^{i-1}$ in Prior art 1.

When the transmission enabled period (STa) and the transmission disabled period (STb) is the same (STa=STb) in Prior art 1, for example, because the ith ("I" is a natural number) remote controller repeats the transmission period (ST) where the number of the data transmission periods (DTa) is set to $2^{i-1}$ ("I" is a positive integer), and the transmission enabled period is set to the unit transmission period (TT)×$2^{i-1}$ as shown in FIG. 11, and the receiver of any one of channels receives the signal only from that channel during one transmission period (ST) for CH 5 whose "i" is the largest, the single receiver respectively receives the independent transmission signals for all channels at the same frequency based on the same protocol.

However, among the remote controllers having properly set "i" ("i" is a natural number) for the individual channels, a remote controller which has a larger "i" has the transmission enabled period (STa) for continuously transmitting a signal, and the transmission disabled period (STb) for stopping transmitting the signal longer than that for a remote controller with smaller "i" in the signal transmission in the prior art as shown in FIG. 11. For example, after the remote controller for CH 5 repeats to transmit the signals 16 times (part X), a period where the transmission is disabled continues for 16 unit transmission periods (TT) (part Y). When a button for commanding transmission is pressed in the transmission disabled period (STb) on the remote controller for CH 5, the transmission is disabled until the next transmission enabled period (Sta). This slows down the response of the receiver to the operation. Specifically, when five players use five remote controllers to play a video game, for example, there is a problem that when a player for CH5 instructs a transmission at X2 again immediately after the player instructs a transmission at X1, because X2 is in the transmission disabled period (STb) for the remote controller for CH 5, the commanded information is cancelled for the second time.

The purpose of the present invention is to provide a transmission and reception method with multiple remote controllers where a single receiver receives individual transmission signals at the same frequency based on the same protocol for all channels, and differences in the response time which occur among the individual channels are decreased.

OBJECTS AND SUMMARY OF THE INVENTION

It is an object of the present invention to provide a transmission and reception method with multiple remote controllers comprising multiple remote controllers for transmitting transmission signals with different transmission periods (ST). The method defines equal unit transmission periods (TT) for individual channels, and a single receiver for receiving the transmission signals from the individual remote controllers where the unit transmission period (TT) consists of a data transmission period (DTa) and a data stop period (Dtb). The data stop period (DTb) is equal to or longer than the data transmission period (Dta). The single transmission period (ST) for the individual remote controllers is $2^i$ times (where "i" is a natural number equal to or more than 3, and a unique number set to a proper number different from one channel to another) the unit transmission period (TT). The unit transmission period consists of transmission enabled periods (STa) and transmission disabled periods (STb) in a sequence of the transmission enabled period (STa) for $2^{i-2}$ times the unit transmission period (TT), the transmission disabled period (STb) for $2^{i-3}$ times the unit transmission period (TT), the transmission enabled period (STa) for $2^{i-3}$ times the unit transmission period (TT), the transmission disabled period (STb) for $2^{i-2}$ times the unit transmission period (TT), the transmission enabled period (STa) for $2^{i-3}$ times the unit transmission period (TT), the transmission disabled period (STb) for $2^{i-3}$ times the unit transmission period (TT), and the individual remote controllers transmit signals using channels that are different from one another.

The present invention provides an alternative transmission and reception method with multiple remote controllers comprising multiple remote controllers for transmitting transmission signals with different transmission periods (ST) consisting of equal unit transmission periods (TT) for individual channels, and a single receiver for receiving the transmission signals from the individual remote controllers where the unit transmission period (TT) consists of a data transmission period (DTa) and a data stop period (Dtb). The data stop period (DTb) is equal to or longer than the data transmission period (Dta). The single transmission period (ST) is twice the unit transmission period (TT). The single transmission period (ST) and consists of a transmission enabled period (STa) for the unit transmission period (TT), and a transmission disabled period (STb) for the unit transmission period (TT) in this sequence for a first remote controller. The single transmission period (ST) is four times as long as the unit transmission period (TT), and consists of the transmission enabled period (STa) for twice the unit transmission period (TT), and the transmission disabled period (STb) for twice the unit transmission period (TT) in this sequence for a second remote controller. The single transmission period (ST) for the individual remote controllers is $2^i$ times (where "I" is a natural number equal to or more than 3, and a unique number set to a proper number different from one channel to another) of the unit transmission period (TT), and consists of the transmission enabled periods (STa) and the transmission disabled periods (STb) in a sequence of the transmission enabled period (STa) for $2^{i-2}$ times the unit transmission period (TT), the transmission disabled period (STb) for $2^{i-3}$ times the unit transmission period (TT), the transmission enabled period (STa) for $2^{i-3}$ times the unit transmission period (TT), the transmission disabled period (STb) for $2^{i-2}$ times the unit transmission period (TT), the transmission enabled period (STa) for $2^{i-3}$ times the unit transmission period (TT), the transmission disabled period (STb) for $2^{i-3}$ times the unit transmission period (TT). The individual remote controllers transmit signals using channels that are different from one another.

The present invention provides effects described below.

The individual remote controllers transmit a signal within the unit transmission period (TT) which is constituted such that the data stop period (DTb) is equal to or more than the data transmission period (DTa). The individual remote controllers transmit signals based on patterns represented by the transmission period (ST). The pattern differs from one remote controller to another.

The remote controller transmits the transmission signal in the transmission period (ST) as a unit period, which is $2^i$ times (where "I" is a natural number equal to or more than 3, and a unique number set to a proper number different from one channel to another) of the unit transmission period (TT), and consists of transmission enabled periods (STa) and transmission disabled periods (STb) in the sequence of the transmission enabled period (STa) for $2^{i-2}$ times the unit transmission period (TT), the transmission disabled period (STb) for $2^{i-3}$ times the unit transmission period (TT), the transmission enabled period (STa) for $2^{i-3}$ times the unit transmission period (TT), the transmission disabled period (STb) for $2^{i-2}$ times the unit transmission period (TT), the transmission enabled period (STa) for $2^{i-3}$ times the unit transmission period (TT), and the transmission disabled period (STb) for $2^{i-3}$ times the unit transmission period (TT).

The multiple remote controllers individually transmit signals on the different channels.

Thus, a period when a signal from only a single remote controller is received always occurs for all of the remote controllers on the receiver which receives the transmission signals from the individual remote controllers.

When the remote controllers consist of a first remote controller, a second remote controller, and third remote controllers, for the first remote controller, the single transmission period (ST) is twice the unit transmission period (TT), and consists of the transmission enabled period (STa) for the unit transmission period (TT), and the transmission disabled period (STb) for the unit transmission period (TT) in this sequence.

For the second remote controller, the single transmission period (ST) is four times the unit transmission period (TT), and consists of the transmission enabled period (STa) for twice the unit transmission period (TT), and the transmission disabled period (STb) for twice the unit transmission period (TT) in this sequence.

For the third remote controller, a plurality of which might be provided, the single transmission period (ST) is $2^i$ times (where "I" is a natural number equal to or more than 3, and a unique number set to a proper number different from one channel to another) the unit transmission period (TT), and consists of the transmission enabled periods (STa) and the transmission disabled periods (STb) in a sequence of the transmission enabled period (STa) for $2^{i-2}$ times the unit transmission period (TT), the transmission disabled period (STb) for $2^{i-3}$ times the unit transmission period (TT), the transmission enabled period (STa) for $2^{i-3}$ times the unit transmission period (TT), the transmission disabled period (STb) for $2^{i-2}$ times the unit transmission period (TT), the transmission enabled period (STa) for $2^{i-3}$ times the unit transmission period (TT), the transmission disabled period (STb) for $2^{i-3}$ times the unit transmission period (TT).

The individual third remote controllers transmit signals on channels that are different from one another.

Thus, even while the receiver, which receives the transmission signals from the individual remote controllers, is receiving transmission signals from the individual remote controllers, there are always periods where a transmission signal from only one remote controller is received.

The above, and other objects, features and advantages of the present invention will become apparent from the following description read in conjunction with the accompanying drawings, in which like reference numerals designate the same elements.

DETAILED DESCRIPTION OF THE PREFERRED EMBODIMENT

Figure 1:
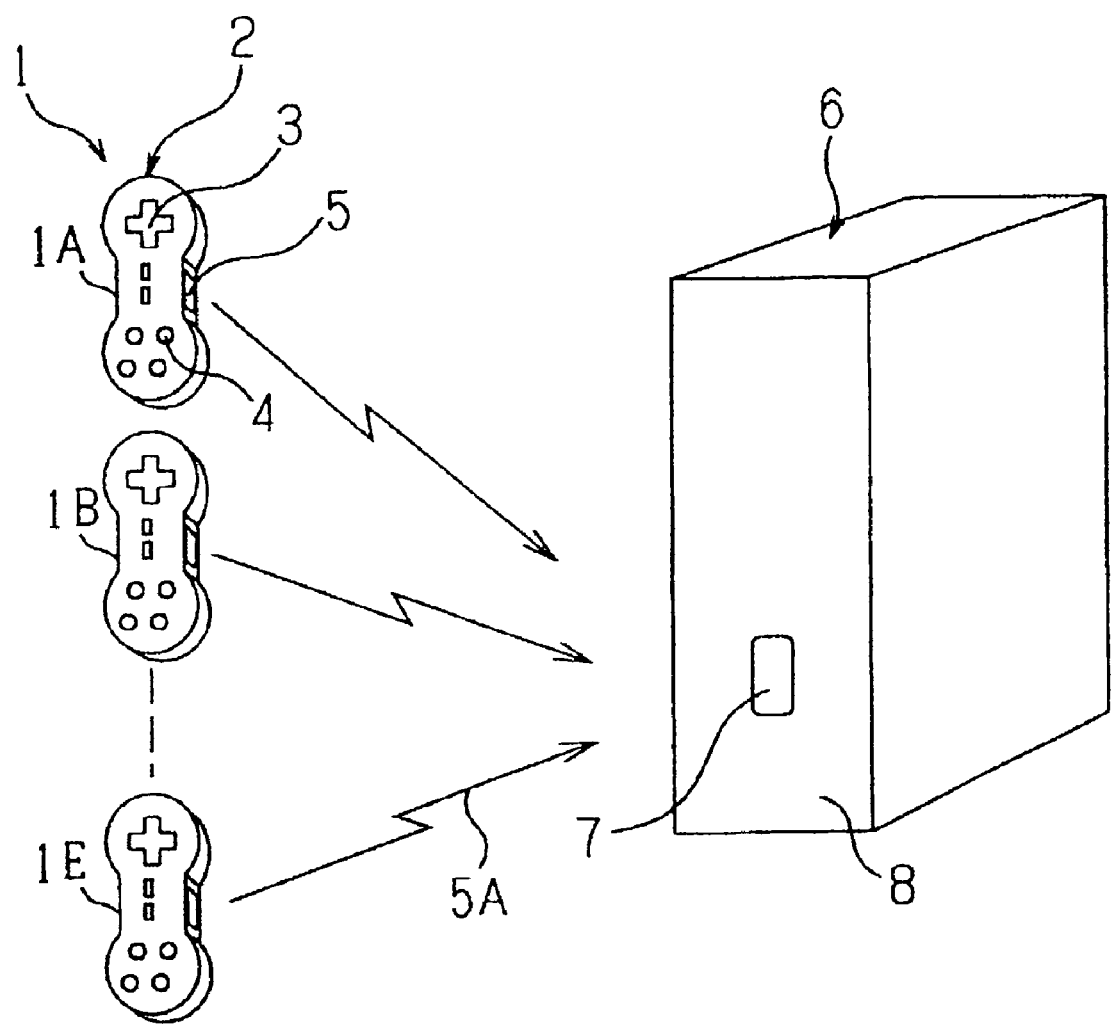
FIG. 1 is a descriptive drawing showing a transmission and reception method with multiple remote controllers.

Referring to FIG. 1, a plurality of remote controllers 1 are used, with one remote controller 1 for each transmission channel. The remote controllers 1 for the individual channels are identified as remote controllers 1A, 1B, 1C, . . . . An operation input part 2 is included on each individual remote controllers 1 for entering an instruction datum for manual or automatic remote control. The operation input part 2, in the present embodiment, consists of a cross-shape button switch 3 for various operations, and button switches 4 for special instructions. While the cross-shape button switch 3 and multiple button switches 4 form the operation input part 2 in this embodiment, other switches including a selection switch (not shown) may be included in the input operation part 2. The setting of the selection switch may change according to applications. The inclusion of a selection switch, or of any other type of control in the operation input part 2 should be considered as within the scope and spirit of the present invention.

The individual remote controllers 1 include a control unit 5 (internal to each controller and thus not shown) for forming a predetermined transmission signal for the remote control based on instruction data entered from the operation input part 2, and for transmitting it as an instruction signal. Although the control unit 5 transmits the transmission signal as an infrared signal in the present embodiment, other transmission media, such as radio or acoustic, may be used to transmit instruction signals. The transmission timing of the signal from the control unit 5 is based on the operation of the operation input part 2.

A receiver 6 in a machine main unit 8 receives transmission signals transmitted from the multiple remote controllers 1. The machine main unit 8 performs operations commanded by the signals received from the multiple remote controllers 1. The receiver 6 includes a receiving unit 7 for receiving signals transmitted from the individual remote controllers 1. The receiver 6 may be mounted directly on the machine main unit 8, or it may be located independently of the machine main unit 8, with the signals connected to it through a signal line for transmitting and receiving signals.

The multiple remote controllers 1 and the receiver 6 are connected by infrared links with the receiver 6 receiving the transmission signals from the remote controllers 1.

Because the receiver 6 can decode the infrared signals transmitted from the multiple remote controllers 1A, 1B, 1C, . . . , and can interpret a signal from one effective remote controller, the receiver 6 interprets a received signal to control a target shown on the machine main unit 8 such as a game machine. The machine main unit 8 to be controlled may control the motion of a character, or may change a scene to be shown on a display (not shown) such as, for example, a home television set. There is no specific limit for what the received signal instructs.

The transmission and reception method with the multiple remote controllers 1A, 1B, 1C, . . . , for the transmitters 1 and the receiver 6 is formed with a predetermined method which reproduces the transmission signals even in the presence of interference between the signals from the multiple remote controllers 1A, 1B, 1C, . . . . The transmission and reception method permits the receiving unit 7 to always receive an independent signal in the data transmission period (DTa) without interference for each of the individual remote controllers 1 while the multiple remote controllers 1A, 1B, 1C, . . . are repeating their transmissions.

The multiple remote controllers 1A, 1B, 1C, . . . consist of a first remote controller 1A, a second remote controller 1B, and multiple third remote controllers 1C, 1D, 1E, . . . . First, unique numbers I=3, 4, 5, . . . ("I" is a natural number equal to or more than 3) are assigned to the individual third remote controllers 1C, 1D, 1E, . . . , which constitute the transmitters in the transmission and reception method for the first remote controller 1A, the second remote controller 1B, the multiple third remote controllers 1C, 1D, 1E, . . . and the receiver 6.

The following section details the transmission and reception method.

Figure 2:
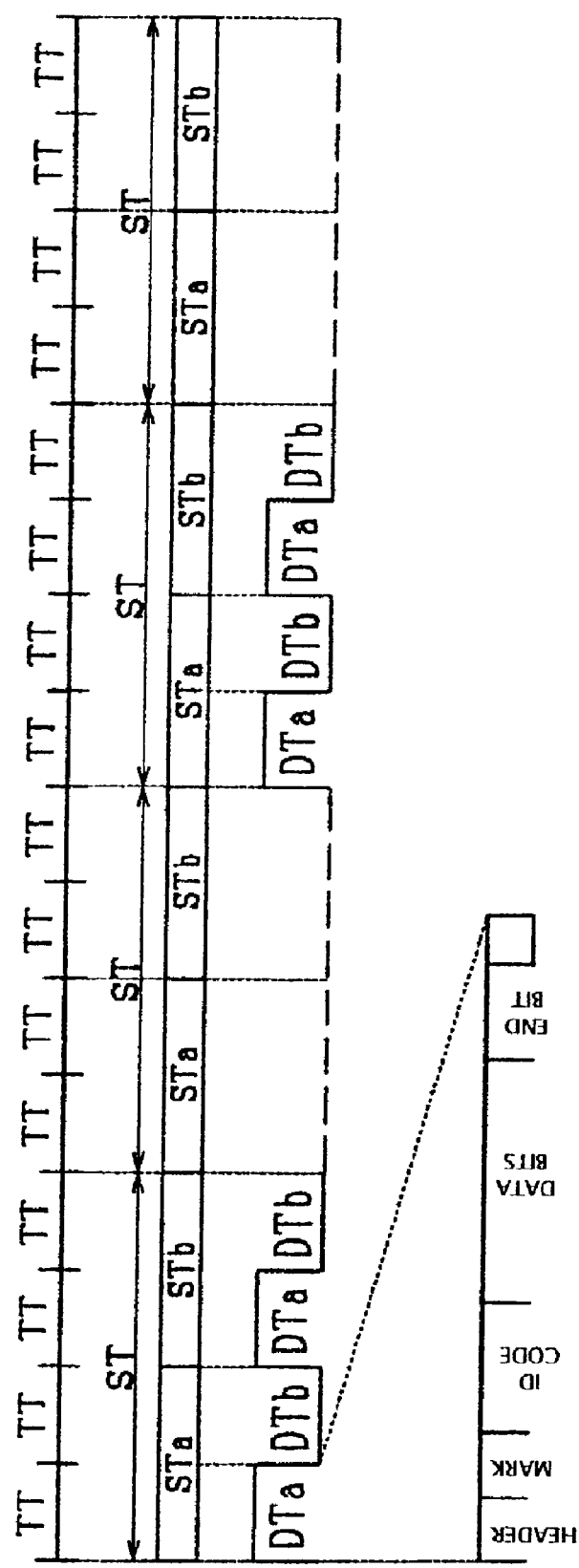
FIG. 2 is a timing chart showing the transmission and reception method with multiple remote controllers.

Referring now to FIG. 2, the signals transmitted from the individual remote controllers 1, which are then received by the receiver 6 for controlling the machine main unit 8, are transmitted as frames. One frame of data consists of a header, a mark, an ID code (four bits), data (control data of 12 bits), and an end bit. The frame is transmitted during the data transmission period (DTa). The format of the frame signal to be transmitted can be changed as necessary, so that it can be set to satisfy a required format. The data stop period (DTb) is provided after the data transmission period (Dta). A unit transmission period (TT) consists of the data transmission period (DTa) and the data stop period (DTb). The unit transmission period (TT) is the same length for all of the remote controllers 1 for their individual channels.

Thus, the unit transmission period (TT) consists of the data transmission period (DTa) and the data stop period (Dtb). The data transmission period (DTa) and the data stop period (DTb) have a relationship wherein the data transmission period (Dta)≦the data stop period (DTb).

A transmission period (ST) consists of the transmission enabled periods (STa) for enabling the signal transmission for a predetermined number of the unit transmission periods (TT), and the transmission disabled periods (STb) for disabling the signal transmission for a predetermined number of the unit transmission periods (TT).

The individual remote controllers 1 each are set to different transmission periods (ST). Each transmission period is a single period based on the unit transmission period (TT) to produce states where the receiver 6 receives a signal (extracts a signal) from only one of the remote controllers 1 among all of the individual remote controllers 1 which may be attempting to transmit at the same time.

Figure 3:
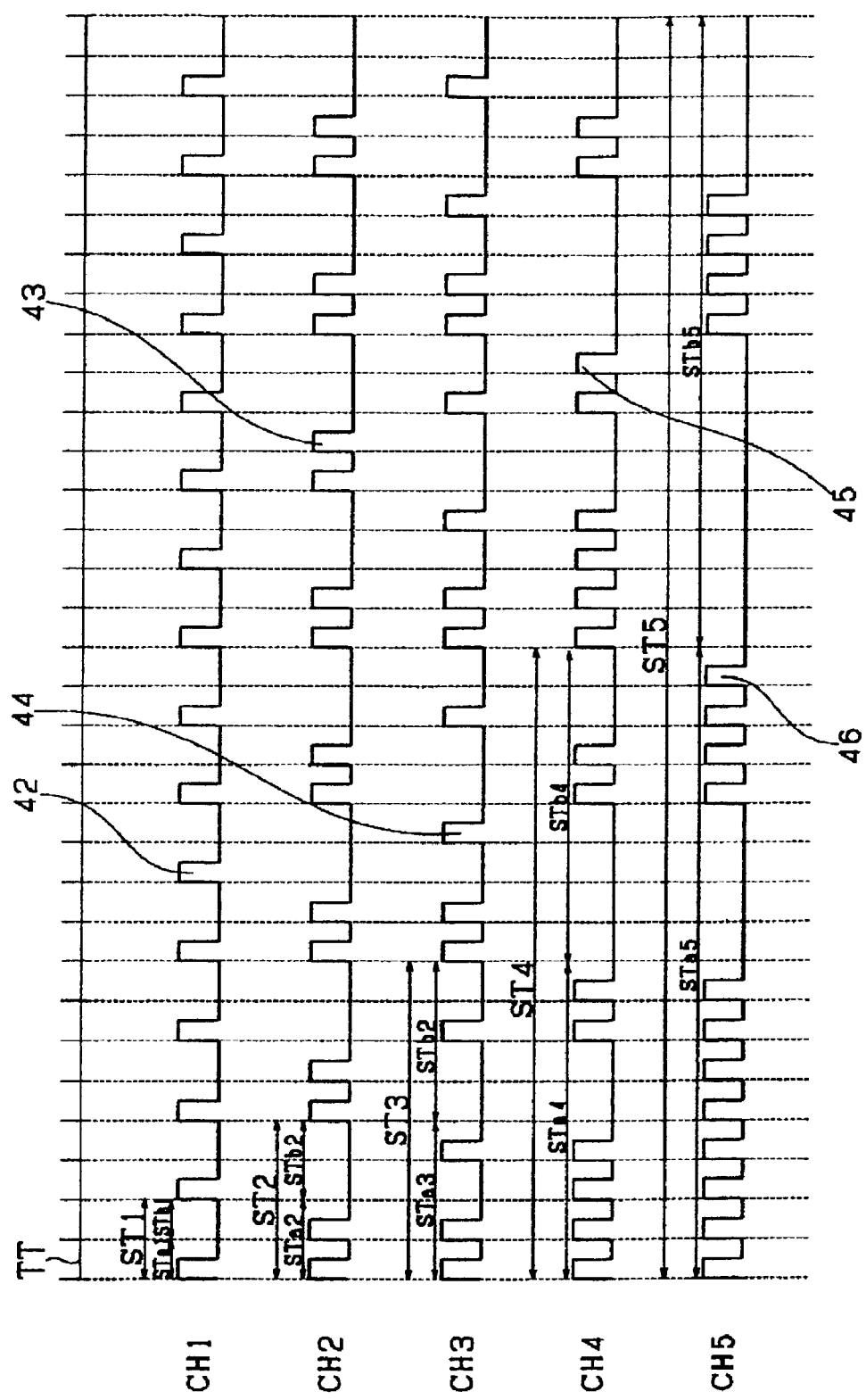
FIG. 3 is a timing chart showing a specific example where five remote controllers simultaneously transmit.

Referring to FIG. 3, it is seen that the first remote controller 1A has one transmission period (ST) consisting of a transmission enabled period (STa) having a period equal to the unit transmission period (TT), followed by a transmission disabled period (STb) having a period equal to the unit transmission period (TT). The transmission period (ST) of the first remote controller 1A has the shortest period in the present embodiment. The following section refers to the first remote controller 1A while assuming it is identified as channel 1 (CH1).

The second remote controller 1B (CH2) has a transmission period (ST) consisting of a transmission enabled period (STa) having a length equal to two unit transmission periods (TT), followed by a transmission disabled period (STb) having a length equal to two unit transmission periods (TT). The transmission period (ST) of the second remote controller 1B has the second shortest period in the present embodiment.

The following section describes the transmission period (ST) for the third remote controllers 1C, 1D, 1E, . . . (CH3, CH4, AND CH5). The transmission period (ST) for the third remote controller 1C, 1D, 1E, . . . is $2^i$ times (where "I" is a natural number equal to 3 or more. "I" is a unique proper number that is different for each channel) the unit transmission period (TT). One period of the transmission period (ST) consists of transmission enabled periods (STa) and transmission disabled periods (STb) in a sequence. The transmission enabled period (STa) continues for $2^{i-2}$ times the unit transmission period (TT). The transmission disabled period (Stb) continues for $2^{i-3}$ times the unit transmission period (TT). The next transmission enabled period (Sta) continues for $2^{i-3}$ times the unit transmission period (TT), and its related transmission disabled period (Stb) continues for $2^{i-2}$ times the unit transmission period (TT). The ensuing transmission enabled period (STa) continues for $2^{i-3}$ times the unit transmission period (TT), with its related transmission disabled period (Stb) continuing for $2^{i-3}$ times the unit transmission period (TT). The following section refers to the plurality of third remote controllers as follows:

the third remote controller 1C for i=3 for channel 3 (CH3), the third remote controller 1D for i=4 for channel 4 (CH4), The third remote controller 1E for i=5 for channel 5 (CH5).

Continuing to refer to FIG. 3, the following section describes a specific example of the transmission signals from the individual remote controllers 1.

One period of the transmission period (ST1) is twice the unit transmission period (TT), the transmission enabled period (STa1)=the unit transmission period (TT), the unit transmission periods (TT) consisting of the data transmission period (DTa) and the data stop period (DTb) is generated once in the transmission enabled period (STa1). Following the transmission enabled period STa1, a transmission disabled period (STb1) is defined equal to the unit transmission period (TT). The transmission period (ST1) is repeated on the first remote controller 1A for channel 1 (CH1).

Similarly, the transmission period (ST2) is four times the unit transmission period (TT), the transmission enabled period (STa2)=the unit transmission period (TT)×2. The unit transmission periods (TT) consisting of the data transmission period (DTa) and the data stop period (DTb) are generated twice in the transmission enabled period (STa2). This is followed by a transmission disabled period (STb2), equal in length to the unit transmission period (TT)×2. The transmission period (ST2) is repeated on the second remote controller 1B for channel 2.

Because the remote controller 1C for channel 3 has a unique number i=3, the transmission period (ST3) is $2^i$=8. That is, one transmission period consists of eight unit transmission periods (TT). The unit transmission period (TT), consisting of the data transmission period (DTa) and the data stop period (DTb), is generated twice in a transmission enabled period (STa3) of $2^{i-2}$×the unit transmission period (TT)=the unit transmission period (TT)×2. A transmission disabled period (STb3) of $2^{i-3}$×the unit transmission period (TT)=the unit transmission period (TT)×1 is provided, the unit transmission period (TT) consisting of the data transmission period (Dta). The data stop period (DTb) is generated once in the transmission enabled period (STa3) of $2^{i-3}$×the unit transmission period (TT)=the unit transmission period (TT)×1. The transmission disabled period (STb3) of $2^{i-2}$×the unit transmission period (TT)=the unit transmission period (TT)×2. The unit transmission period (TT) consisting of the data transmission period (DTa) and the data stop period (DTb) is generated once in the transmission enabled period (STa3) of $2^{i-3}$×the unit transmission period (TT)=the unit transmission period (TT)×1, and the transmission disabled period (STb3) of $2^{i-3}$×the unit transmission period (TT)=the unit transmission period (TT)×1 is provided in one period of the transmission period (ST).

Because the remote controller 1D for channel 4 has a unique number i=4, the transmission period (ST4) is $2^i$=16. One period consists of 16 unit transmission periods (TT). The unit transmission period (TT), consisting of the data transmission period (DTa) and the data stop period (DTb), is generated four times in a transmission enabled period (STa4) of $2^{i-2}$×the unit transmission period (TT)=the unit transmission period (TT)×4. A transmission disabled period (STb4) of $2^{i-3}$×the unit transmission period (TT)=the unit transmission period (TT)×2 is provided. The unit transmission period (TT), consisting of the data transmission period (DTa) and the data stop period (DTb), is generated twice in the transmission enabled period (STa4) of $2^{i-3}\times$the unit transmission period (TT)=the unit transmission period (TT)×2, the transmission disabled period (STb4) of $2^{i-2}\times$the unit transmission period (TT)=the unit transmission period (TT)×4. The unit transmission period (TT), consisting of the data transmission period (DTa) and the data stop period (DTb), is generated twice in the transmission enabled period (STa4) of $2^{i-3}\times$the unit transmission period (TT)=the unit transmission period (TT)×2. The transmission disabled period (STb4) of $2^{i-3}\times$ the unit transmission period (TT)=the unit transmission period (TT)×2 is provided in one period of the transmission period (ST).

Because the remote controller 1E for channel 5 has a unique number i=5, the transmission period (ST5) is $2^{i}$=32. Thus one period consists of 32 unit transmission periods (TT). The unit transmission period (TT), consisting of the data transmission period (DTa) and the data stop period (DTb), is generated eight times in a transmission enabled period (STa5) of $2^{i-2}\times$the unit transmission period (TT)=the unit transmission period (TT)×8. A transmission disabled period (STb5) of $2^{i-3}\times$the unit transmission period (TT)=the unit transmission period (TT)×4 is provided. The unit transmission period (TT), consisting of the data transmission period (DTa) and the data stop period (DTb), is generated four times in the transmission enabled period (STa5) of $2^{i-3}\times$the unit transmission period (TT)=the unit transmission period (TT)×4, the transmission disabled period (STb5) of $2^{i-2}\times$the unit transmission period (TT)=the unit transmission period (TT)×8 is provided. The unit transmission period (TT) consisting of the data transmission period (DTa) and the data stop period (DTb) is generated four times in the transmission enabled period (STa5) of $2^{i-3}\times$the unit transmission period (TT)=the unit transmission period (TT)×4. The transmission disabled period (STb5) of $2^{i-3}\times$the unit transmission period (TT)=the unit transmission period (TT)×4 is provided in one period of the transmission period (ST).

While the unique numbers I=3 to 5 are assigned to channels 3 to 5, any other unique numbers, such as 3, 5, and 7, may be properly assigned to them, as long as they are unique to one another.

In this way, the number of data transmission periods (DTa) is set in the predetermined transmission period (STa) for the first remote controllers 1A and the second remote controller 1B, and is set in the transmission period (STa) based on the unique number "I" for the plurality of third remote controllers 1C, 1D, 1E, . . . . The transmission enabled periods (STa) and the transmission disabled periods (STb) are set according to the set numbers, and are repeated to generate time periods in which each of the individual remote controllers respectively have periods in which there is no interference from the other remote controllers.

The following section specifically exemplifies the transmission and reception method with multiple remote controllers for generating data in time periods in which there is no interference from the other remote controllers 1 within a predetermined period based on the example described above.

Assuming the worst case where all of the individual remote controllers 1 simultaneously starts transmission with the following timing:

1) a transmission for one channel is shifted by a half cycle, 2) a transmission for one channel is shifted by one cycle, and 3) the individual channels are shifted by one cycle relative to one another for the remote controllers 1A to 1E for using the five channels (I=3 to 5).

First, the following section describes a case where the remote controllers for the five channels (I=3 to 5) simultaneously start transmission. This can happen when five users simultaneously operate their remote controllers 1 simultaneously generate transmission signals. Although possible, this situation is physically very rare. This case is easy to understand, and if transmitted data are to be always extracted, the data can be extracted more securely for signals generated randomly.

The first remote controller 1A for channel 1, the second remote controller 1B for channel 2, and the third remote controller 1C to 1E for channel 3 to 5 (unique number i=3 to 5) individually transmit signals while repeating their periods of transmission period (ST1, ST2, ST3, ST4, or ST5). The receiver 6 can receive the transmitted signals during any one of the unit transmission periods (TT) without interference from the other remote controllers 1 as shown in FIG. 3.

For example, a transmission signal 42 from the remote controller 1A for channel 1 in the data transmission period (DTa) corresponds to the data transmission signal independently received by the receiver 6. A transmission signal 43 from the remote controller 1B for channel 2 in the data transmission period (DTa) corresponds to the data transmission signal independently received by the receiver 6. A transmission signal 44 from the remote controller 1C for channel 3 in the data transmission period (DTa) corresponds to the data transmission signal independently received by the receiver 6. A transmission signal 45 from the remote controller 1D for channel 4 in the data transmission period (DTa) corresponds to the data transmission signal independently received by the receiver 6. A transmission signal 46 from the remote controller 1E for channel 5 in the data transmission period (DTa) corresponds to the data transmission signal independently received by the receiver 6.

Only the signal for channel 1 (CH1) exists without interference in the sixth transmission period (ST1) (in the 11th unit transmission period (TT)) for the remote controller 1A for channel 1 (CH1). Only the signal for channel 2 (CH2) exists without interference in the sixth transmission period (ST2) (in the 22nd unit transmission period (TT)) for the remote controller 1B for channel 2 (CH2). Only the signal for channel 3 (CH3) exists without interference in the second transmission period (ST3) (in the 12th unit transmission period (TT)) for the remote controller 1C for channel 3 (CH3). Only the signal for channel 4 (CH4) exists without interference occurs in the second transmission period (ST4) (in the 24th unit transmission period (TT)) for the remote controller 1D for channel 4 (CH4). Only the signal for channel 5 (CH5) exists without interference in the first transmission period (ST5) (in the 16th unit transmission period (TT)) for the remote controller 1E for channel 5 (CH5). Thus, the receiver 6 receives the signal from only one remote controller 1 without interference from the other remote controllers 1.

Figure 4:
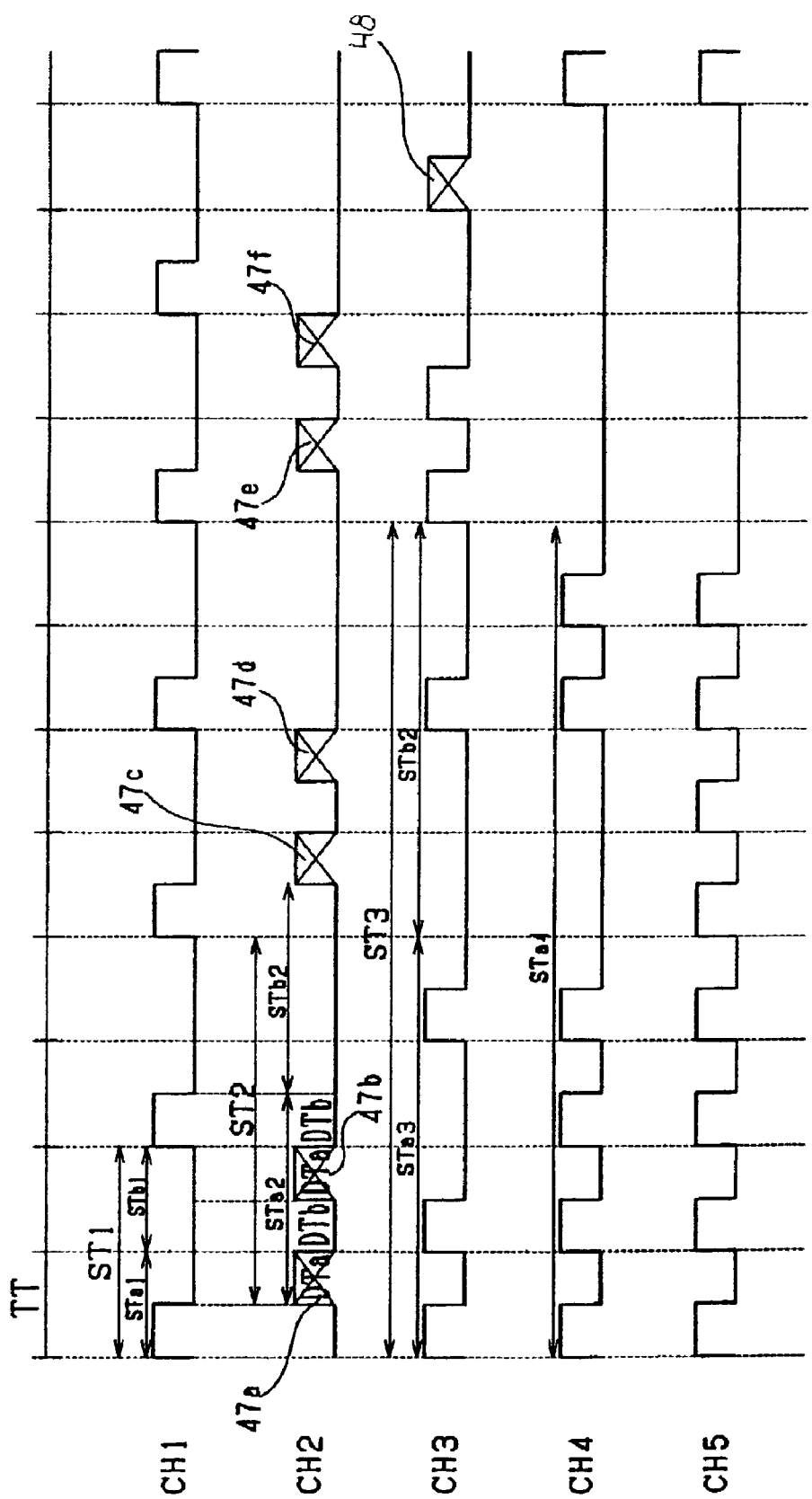
FIG. 4 is a timing chart showing a specific example where a remote controller for one channel transmits with a half cycle of shift.

Referring to FIG. 4, the case is shown in which the transmission for one of the five channels is shifted by a half cycle relative to the transmissions for the other channels based on FIG. 4. That is, the transmission for one of the five channels (I=3 to 5) is shifted by a half cycle relative to the remainder of the channels. With a half-cycle shift, the data transmission period (DTa) of the shifted channel has the relationship with the unshifted channels such that the data stop period (DTb) have a relationship of Dta=Dtb. Also, the transmission enabled period (STa) and the transmission disabled period (STb) have a relationship of STa=Stb. The remote controllers 1 for channel 1 to channel 5 have the relationship that the remote controller 1B for channel 2 starts the data transmission period (DTa2) from the center position of the unit transmission period (TT), which is symmetrical with the data transmission period (DTa1) of the remote controller 1A.

In this case, because the remote controllers for channel 1 to channel 5 start transmission simultaneously, and the data transmission periods (DTa2) coincide with the data stop periods (DTb) of channel 1, 3, 4, and 5, the receiver 6 can still receive the transmission signal 47a to 47h for channel 2 during which the signals remain free of interference from signals from the other remote controllers.

Because the transmission signals for the other channels 1, 3, 4, and 5 are all transmitted as shown in FIG. 3, and the data signal for channel 2, which is shifted by a half cycle, does not overlap them, there are times when the receiver 6 receives the independent transmission signals for channels 1, 3, 4, and 5 in the same manner as described for FIG. 3.

Similarly, when the transmission from a remote controller 1 other than that for channel 2 is shifted by a half cycle, because the transmission signal shifted by a half cycle from the remote controller 1 does not overlap the transmission signals from the other remote controllers 1, there are always times when the receiver 6 receives the independent data transmission signals transmitted for all of the individual channels without mutual interference.

When two or more remote controllers 1 transmit signals which are shifted by a half cycle, the data transmission signals shifted by a half cycle from these remote controllers 1 do not overlap one another. The receiver 6 continues to receive the independent transmission signals which are not shifted in the manner shown in FIG. 3.

Figure 5:
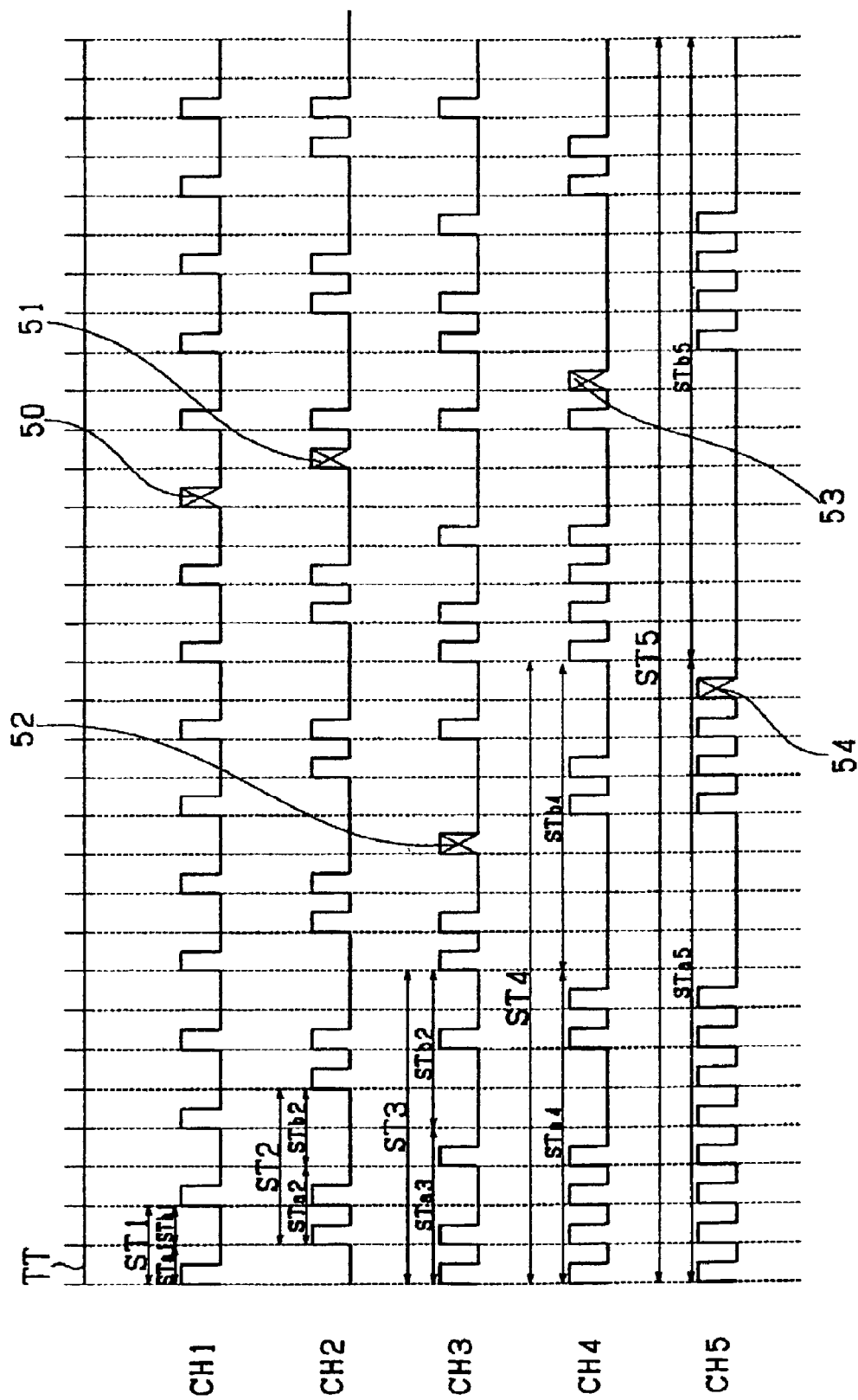
FIG. 5 is a timing chart showing a specific example where a remote controller for one channel transmits with one cycle of shift.

Referring now to FIG. 5, the following section describes a case where a transmission for one of the five channels is shifted by one cycle relative to the transmissions for the other channels. When the transmission for one channel from one remote controller 1 of the remote controllers 1 for the five channels (i=3 to 5) is shifted by one cycle relative to the other channels, if the data transmission period (DTa) and the data stop period (DTb) have a relationship of Dta=DTb, and simultaneously the transmission enabled period (STa) and the transmission disabled period (STb) have a relationship of STa=STb, the remote controller 1 for channel 2 generates the transmission period (ST2) delayed by one cycle while the remote controllers 1 for channels 1, 3, 4, and 5 generate the transmission periods (ST1, ST3, ST4, and ST5) simultaneously.

The data transmission signal for channel 1 (CH1), signal 50, exists and is extracted without interference in the data transmission period (DTa) in the 11th transmission period (ST1) (in the 21st unit transmission period (TT)) for the remote controller 1 for channel 1. The data transmission signal for channel 2 (CH2) exists and is extracted without interference for the transmission signal 51 in a first data transmission period (DTa2) in the sixth transmission period (ST2) (in the 22nd unit transmission period (TT)) for the remote controller 1 for channel 2. As shown in FIG. 3, the signal for channel 3 (CH3) exists alone and is extracted without interference in the second transmission period (ST3) (in the 12th transmission period (TT)) for the remote controller 1C for channel 3 (CH3). The signal for channel 4 (CH4) exists alone and is extracted without interference in the second transmission period (ST4) (in the 24th unit transmission period (TT)) for the remote controller 1 for channel 4. The signal for channel 5 (CH5) exists alone and is extracted without interference in the first transmission period (ST5) (in the 16th unit transmission period (TT)) for the remote controller 1E for channel 5 (CH5). In these states, the receiver 6 receives, and interprets the signal from each channel without interference from the other remote controllers 1.

When, the transmission from the remote controller 1 other than that for channel 2 is shifted by one cycle, which is not detailed, there always exists a time when the receiver 6 receives the independent transmission for this channel. Further, when the transmissions for multiple channels are shifted by one cycle relative to the transmissions for the other channels, similarly, there are always times when the receiver 6 receives independent transmissions for these channels.

Figure 6:
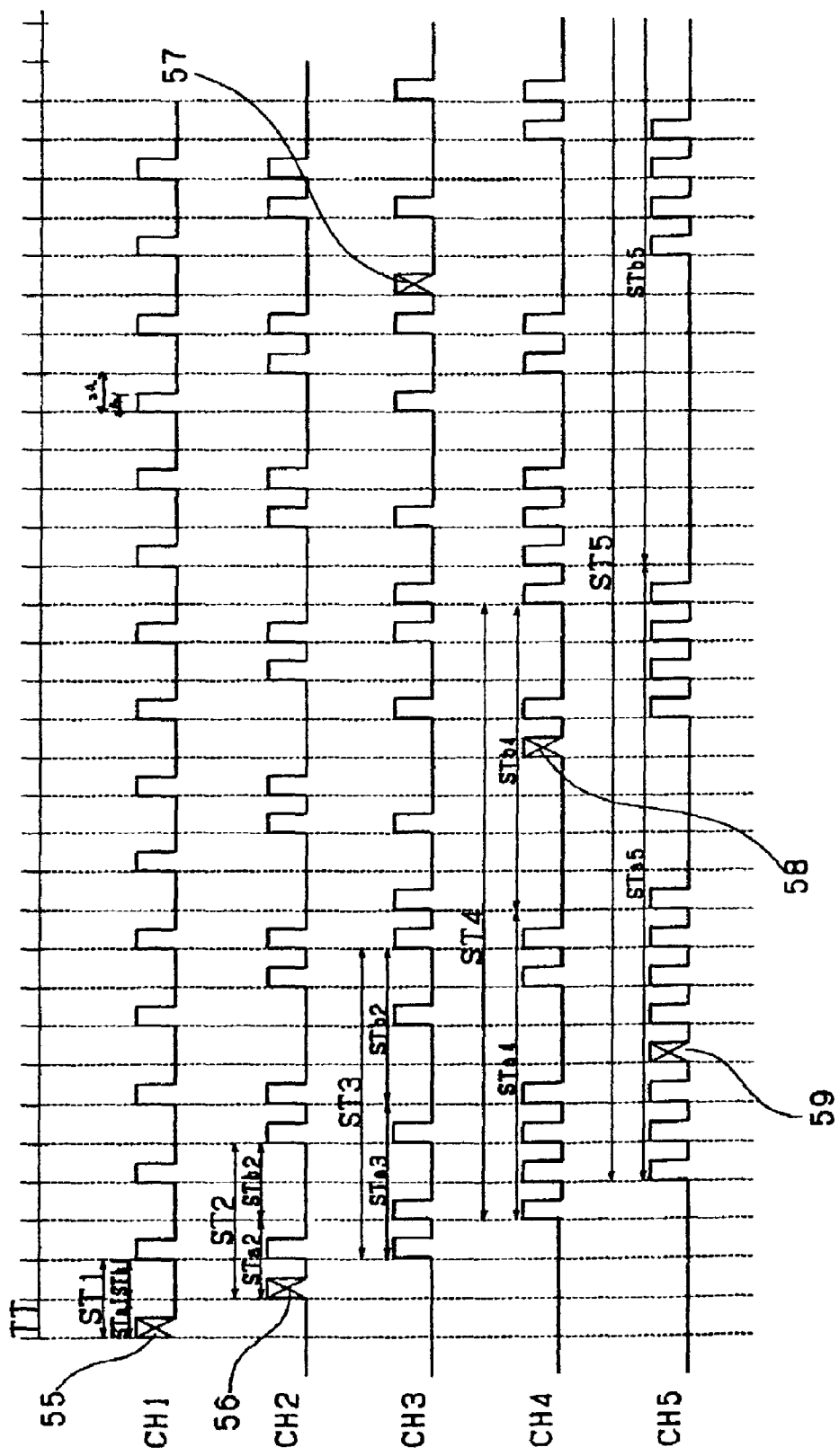
FIG. 6 is a timing chart showing a specific example where the individual remote controllers transmit with one cycle of shift relative to one another.

Referring now to FIG. 6, the situation is shown in which the transmissions from individual channels are shifted by one cycle relative to one another. based on FIG. 6. When the transmissions from the remote controllers 1 for the five channels (i=3 to 5) are shifted by one cycle relative to one another, a transmission signal 55 is transmitted without interference in the data transmission period (DTa1) in the transmission period (STI) for channel 1, a transmission signal 56 is transmitted without interference in the data transmission period (DTa2) in the transmission period (ST2) for channel 2. A transmission signal 57 is transmitted without interference in the data transmission period (DTa3) in the transmission period (ST3) for channel 3. A transmission signal 57 is transmitted without interference in the data transmission period (DTa4) in the transmission period (ST4) for channel 4. A transmission signal 59 is transmitted without interference in the data transmission period (DTa5) in the transmission period (ST5) for channel 5. These signals exist independently without interference from each other, whereby the receiver 6 is capable of receiving all of these signals independently.

While the present embodiment describes the case for the five channels, additional remote controllers 1 for more than five channels can be used to individually transmit signals. Even in such a case there are always times when the receiver 6 receives independent data signals transmitted from the individual remote controllers 1 as described above. In this case, of course, the value of i must be given more unique integer values.

With the present invention, there is always a time when any one of the remote controllers 1 for five channels transmits in a data transmission period (DTa) during which there is no interference from any of the other remote controllers 1 as shown in the specific examples above. Also, it is possible to generate a state in which there is no interference from the other remote controllers regardless of an increase/decrease in the number of channels even when there are times that the multiple remote controllers 1 transmit their transmission signals in an interfered state.

Although the above description is based on infrared remote controllers, the transmission and reception method for the remote control system are a matter of indifference to the present invention. That is, the invention just as easily applies to an RF remote controller, an acoustic remote controller, a bus type wired remote controller, or any other type of remote controller.

Figure 7:
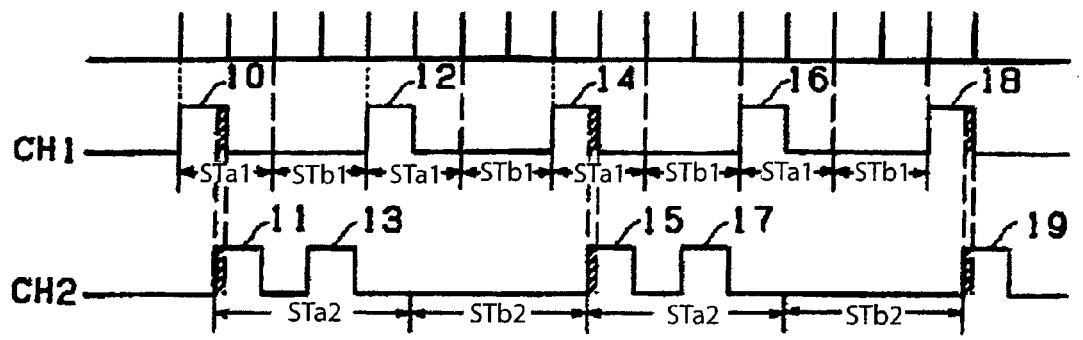
FIG. 7 is a timing chart showing a case where the transmission enabled period (STa)=the transmission disabled period (STb).
Figure 8:
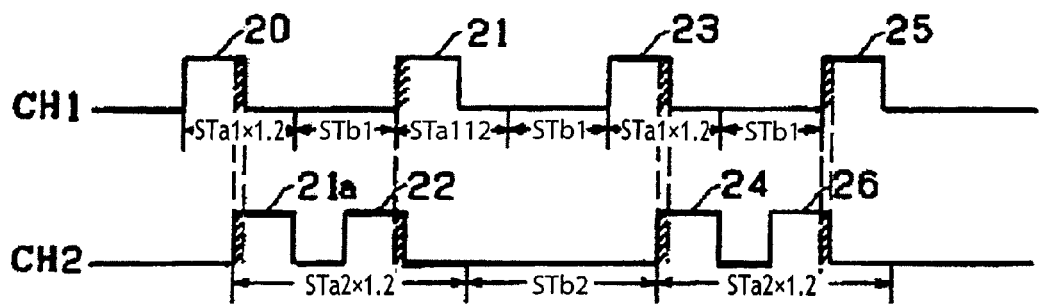
FIG. 8 is a timing chart showing a case where the transmission enabled period (Sta)>the transmission disabled period (STb).

Referring now to FIGS. 7 and 8, the following section explains why a relationship between the transmission enabled period (STa) and the transmission disabled period (STb) is the transmission enabled period (STa)=the transmission disabled period (Stb). FIG. 7 shows a case where the transmission enabled period (STa1)=the transmission disabled period (STb1) for channel 1, and the transmission enabled period (STa2)=the transmission disabled period (STb2) for channel 2.

A first rise of the transmission period (STa2) for channel 2 is slightly shifted with respect to channel 1, and interferes with channel 1. When the relationship between channel 1 and channel 2 satisfies STa1:STb1=STa2:STb2 in addition to the relationships of the transmission enabled period (STa1)=the transmission disabled period (STb1) for channel 1, and the transmission enabled period (STa2)=the transmission disabled period (STb2) for channel 2, even if transmission signals 10 and 11, 14 and 15, and 18 and 19 respectively interfere with each other, there are times when the signals 12, 13, 16, and 17 are not interfered with.

When channel 1 has a relationship in which the transmission enabled period (STa1×1.2)>the transmission disabled period (STb1), channel 2 has a relationship of the transmission enabled period (STa2×1.2)>the transmission disabled period (STb2), and channel 1 and channel 2 have a relationship of (STa1×1.2):STb1=(STa2×1.2):STb2 as shown in FIG. 8, both channel 1 and channel 2 interfere with each other, and there is no state in which the receiver 6 receives each of them independently as described below.

When an interference state exists where the transmission signal 20 of channel 1 interferes with a transmission signal 21a of channel 2 under the conditions above, the fall of the first interfered transmission signal 20 of channel 1 and a rise of the transmission signal 21a of channel 2 interfere with each other (shown as hatched portions).

In this case, the next rise of a transmission signal 21 of channel 1 and the next fall of a transmission signal 22 of channel 2 interfere with each other (shown as hatched portions).

This relationship repeats, so that the individual generated transmission signals 23 and 24, 25 and 26, . . . respectively interfere with each other. As a consequence, transmission on these channels cannot to be extracted (shown as hatched portions). Thus, it is necessary for the present invention to have at least the relationship that the transmission enabled period (STa)=the transmission disabled period (STb).

Figure 9:
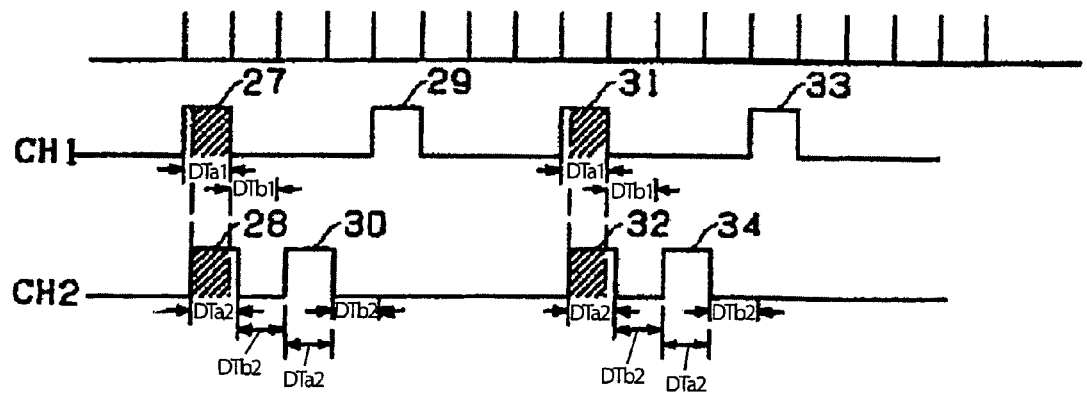
FIG. 9 is a timing chart showing a case where the data transmission period (DTa)=the data stop period (DTb).
Figure 10:
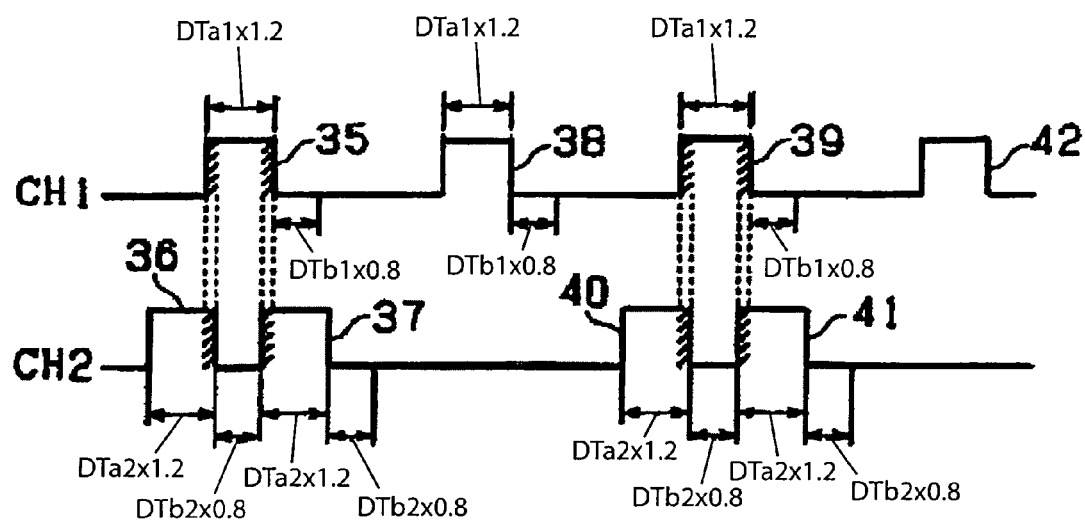
FIG. 10 is a timing chart showing a case where the data transmission period (Dta)>the data stop period (DTb).
Figure 11:
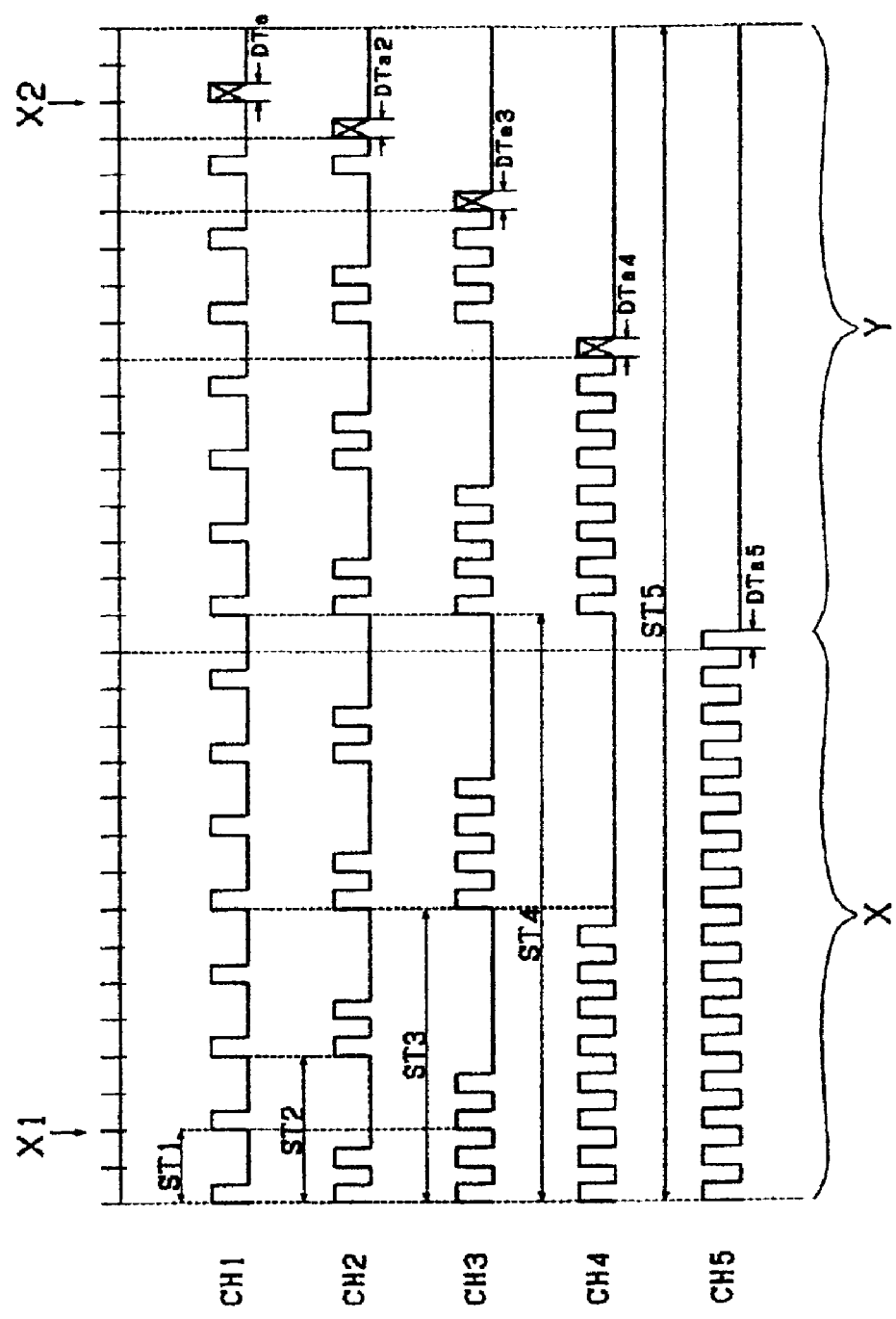
FIG. 11 is a timing chart of a prior art system.

Referring now to FIGS. 9 and 10, the following section describes the reason why the relationship of the data transmission period (Dta)<the data stop period (DTb) is necessary. FIG. 9 shows the case where the relationship between the data transmission period (DTa) and the data stop period (DTb) for channel 1 and channel 2 is Dta=DTb, and the transmission for channel 2 starts slightly later than channel 1 while they interfere with each other.

In this case, the relationship between the data transmission period (DTa1) and the data stop period (DTb1) for channel 1 is DTa1=DTb1, and the relationship between the data transmission period (DTa2) and the data stop period (DTb2) for channel 2 is DTa2=DTb2.

In this case, when the transmission signal for channel 2 is generated slightly later than the transmission signal for channel 1, and they interfere with each other as shown in FIG. 9, although the transmission signals 27 and 28, and 31 and 32 respectively interfere with each other, they do not exist independently. The receiver 6 therefore cannot extract them However, the transmission signals 29, 30, 33, and 34 can be extracted without mutual interference.

FIG. 10 shows a case where the relationship between the data transmission period (DTa) and the data stop period (DTb1) is the data transmission period (DTa)>the data stop period (DTb1), and channel 1 has the relationship wherein the data transmission period (Dta×1.2)>the data stop period (DTb1×0.8). Channel 2 has the relationship wherein the data transmission period (DTa2×1.2)>the data stop period (DTb2×0.8). The relationship between channel 1 and channel 2 is DTa1×1.2:DTb1=DTa2×1.2:DTb2.

The above relationships mean that the data transmission periods DTa1×1.2 and DTa2×1.2 are respectively longer than the data transmission periods DTa1 and DTa2. The data stop periods DTb1×0.8 and DTb2×0.8 are respectively shorter than the data stop periods DTb1 and DTb2.

When channel 1 and channel 2 have these relationships, there always exists a time when a transmission signal 35 for channel 1 is interposed between the transmission signals 36 and 37, so that both of them interfere with the transmission signal 35.

That is, while the receiver 6 can extract a transmission signal 38 for channel 1 in the data transmission period (DTa1×1.2) without mutual interference, a transmission signal 39 for channel 1 interferes with the transmission signals 40 and 41 for channel 2, and the next transmission signal 42 for channel 1 can be extracted.

However, because the transmission signals 36 and 37 for channel 2 interfere with the transmission signal 35 for channel 1, and the transmission signals 40 and 41 interfere with the transmission signal 39 for channel 1, there is no transmission signal which does not interfere with channel 1, and exists independently, and there is consequently no signal which the receiver 6 can extract.

Thus, while there exist states where the transmission signal can be extracted without interference for channel 1, there is no state without interference for channel 2. That is, there is no state where a signal can be extracted, for channel 2. While the receiver 6 can extract the transmission signal for channel 1, the receiver 6 has no chance of extracting of the transmission signal for channel 2. Thus, the present invention must satisfy at least a relationship of the data transmission period (Dta)≦the data stop period (DTb).

In this embodiment, the first remote controller 1A has a transmission period (ST) which has a period that is twice as long as the unit transmission period (TT). The transmission period (ST) consists of the transmission enabled period (STa) having a period equal to the unit transmission period (TT), followed by the transmission disabled period (STb) having a period also equal to the unit transmission period (TT). The second remote controller 1B has a transmission period (ST) which has a period four times as long as the unit transmission period (TT). The transmission period (ST) consists of the transmission enabled period (STa) having a period twice as long as the unit transmission period (TT), and the following transmission disabled period (STb) having a period twice as long as the unit transmission period (TT). However, an application where all remote controllers 1 are the third remote controllers 1C, 1D, 1E, . . . is possible.

While the present embodiment details a case where five remote controllers 1 transmit signals, when the number of the remote controllers 1 is less than five, FIG. 3 shows the states where the receiver 6 can respectively receive the independent signals from these remote controllers 1. When the number of remote controllers 1 is more than five, because a signal for a channel following channel 5 is formed with a transmission period twice as long as a previous channel, and a transmission pattern is formed by respectively doubling the consecutive transmission enabled periods (STa) and the transmission disabled periods (STb), there are always times when the receiver 6 can respectively receive independent signals from all channels as shown in FIG. 3.

Because the present invention always generates times when the transmission signals from the individual remote controllers are not interfered with by the transmission signals from the other remote controllers within a predetermined period while the transmission signals are assumed to have interference with one another, even when the multiple remote controllers are simultaneously used at the same frequency and at the same location, it is possible to transmit based on the same protocol. The remote controller can be simple, inexpensive, and compact.

Because the method of the present invention can replace a part of a conventional long consecutive transmission disabled period with a part of a conventional long consecutive transmission enabled period for a channel having a long transmission period, and the conventional long consecutive transmission disabled period can be decreased, delays in signal reception on the receiver 6 caused by the consecutive transmission disabled period for disabling transmission of a data signal is reduced.

Having described preferred embodiments of the invention with reference to the accompanying drawings, it is to be understood that the invention is not limited to those precise embodiments, and that various changes and modifications may be effected therein by one skilled in the art without departing from the scope or spirit of the invention as defined in the appended claims.

What is claimed is:

1. A transmission and reception system comprising:
a plurality of remote controllers;
each of said plurality of remote controllers including means for transmitting transmission signals;
transmission signals of each of said plurality of remote controllers having a single transmission period (ST) that is different from transmission periods for all others of said plurality;
said transmission periods consisting of equal unit transmission periods (TT) for individual channels;
a single receiver for receiving said transmission signals from said individual remote controllers,
said unit transmission period (TT) consists of a data transmission period (DTa) and a data stop period (DTb);
said data stop period (DTb) is at least as long as said data transmission period (DTa);
said single transmission period (ST) for said individual remote controllers is 2i times (where "i" is a natural number equal to or more than 3, and a unique number that is equal to a proper number different for each channel from all other channels) said unit transmission period (TT);
said single transmission period consists of transmission enabled periods (STa) and transmission disabled periods (STb) in a sequence of said transmission enabled period (STa) for 2i−2 times said unit transmission period (TT), said transmission disabled period (STb) for 2i−3 times said unit transmission period (TT), said transmission enabled period (STa) for 2i−3 times said unit transmission period (TT), said transmission disabled period (STb) for 2i−2 times said unit transmission period (TT), said transmission enabled period (STa) for 2i−3 times said unit transmission period (TT), said transmission disabled period (STb) for 2i−3 times said unit transmission period (TT); and
said individual remote controllers including means for transmitting signals using channels that are different from one another.

2. A transmission and reception system with multiple remote controllers comprising:
a plurality of remote controllers for transmitting transmission signals with different transmission periods (ST);
each of said transmission periods (ST) consisting of equal unit transmission periods (TT) for individual channels;
a single receiver for receiving said transmission signals from said individual remote controllers,
said unit transmission period (TT) consists of a data transmission period (DTa) and a data stop period (DTb), said data stop period (DTb) is at least as long as said data transmission period (DTa),
said single transmission period (ST) is twice said unit transmission period (TT);
for a first remote controller, said single transmission period (ST) consists of a transmission enabled period (STa) for said unit transmission period (TT), and a transmission disabled period (STb) for said unit transmission period (TT) in this sequence;
for a second remote controller, said single transmission period (ST) is four times said unit transmission period (TT), and consists of said transmission enabled period (STa) for twice said unit transmission period (TT), and said transmission disabled period (STb) for twice said unit transmission period (TT) in this sequence;
said single transmission period (ST) for said individual remote controllers is 2i times (where "i" is a natural number equal to or more than 3, and a unique number equal to a proper number that is different from one channel to another) said unit transmission period (TT), and consists of said transmission enabled periods (STa) and said transmission disabled periods (STb) in a sequence of said transmission enabled period (STa) for 2i−2 times said unit transmission period (TT), said transmission disabled period (STb) for 2i−3 times said unit transmission period (TT), said transmission enabled period (STa) for 2i−3 times said unit transmission period (TT), said transmission disabled period (STb) for 2i−2 times said unit transmission period (TT), said transmission enabled period (STa) for 2i−3 times said unit transmission period (TT), said transmission disabled period (STb) for 2i−3 times said unit transmission period (TT); and
said individual remote controllers transmit signals using channels that are different from one another.

* * * * *

UNITED STATES PATENT AND TRADEMARK OFFICE
CERTIFICATE OF CORRECTION

| | |
|---|---|
| PATENT NO. | : 7,031,396 B2 |
| APPLICATION NO. | : 10/176286 |
| DATED | : April 18, 2006 |
| INVENTOR(S) | : Kenichi Miwa |

It is certified that error appears in the above-identified patent and that said Letters Patent is hereby corrected as shown below:

Please replace Fig. 2 with the following:

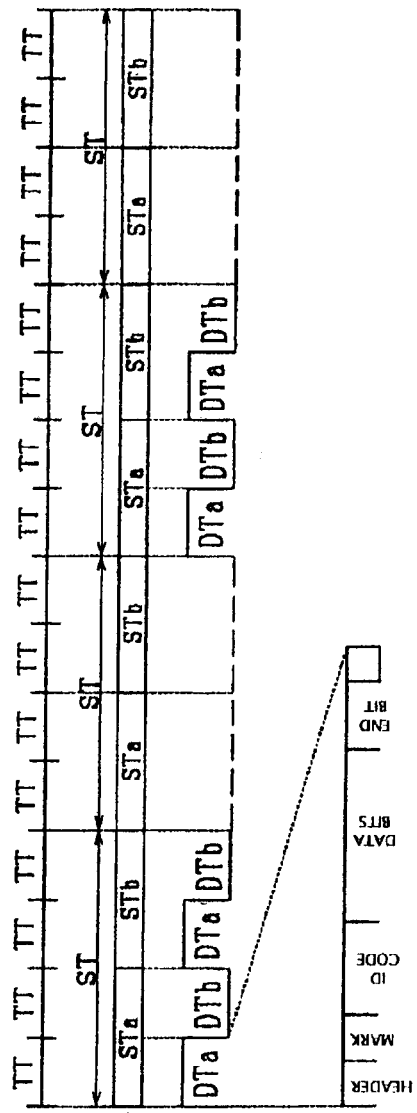

Fig. 2

UNITED STATES PATENT AND TRADEMARK OFFICE
CERTIFICATE OF CORRECTION

PATENT NO. : 7,031,396 B2
APPLICATION NO. : 10/176286
DATED : April 18, 2006
INVENTOR(S) : Kenichi Miwa It is certified that error appears in the above-identified patent and that said Letters Patent is hereby corrected as shown below:

In the claims:

Col. 15, line 46, Claim 1, delete "2i" and insert --$2^i$--
Col. 15, line 54, Claim 1, delete "2i-2" and insert --$2^{i-2}$--
Col. 15, line 56, Claim 1, delete "2i-3" and insert --$2^{i-3}$--
Col. 15, line 57, Claim 1, delete "2i-3" and insert --$2^{i-3}$--
Col. 16, line 2, Claim 1, delete "2i-2" and insert --$2^{i-2}$--
Col. 16, line 4, Claim 1, delete "2i-3" and insert --$2^{i-3}$--
Col. 16, line 5, Claim 1, delete "2i-3" and insert --$2^{i-3}$--
Col. 16, line 37, Claim 2, delete "2i" and insert --$2^i$--
Col. 16, line 44, Claim 2, delete "2i-2" and insert --$2^{i-2}$--
Col. 16, line 45, Claim 2, delete "2i-3" and insert --$2^{i-3}$--
Col. 16, line 47, Claim 2, delete "2i-3" and insert --$2^{i-2}$--
Col. 16, line 49, Claim 2, delete "2i-2" and insert --$2^{i-2}$--
Col. 16, line 50, Claim 2, delete "2i-3" and insert --$2^{i-3}$--
Col. 16, line 52, Claim 2, delete "2i-3" and insert --$2^{i-3}$--

Signed and Sealed this

Eighteenth Day of November, 2008

JON W. DUDAS
*Director of the United States Patent and Trademark Office*